United States Patent [19]
First et al.

[11] Patent Number: 6,076,997
[45] Date of Patent: *Jun. 20, 2000

[54] DEEP MIX SOIL STABILIZATION METHOD

[75] Inventors: Richard C. First, Cleveland Heights; Samy M. Shendy, Cuyahoga Falls; Stephen A. Farrington, Chardon, all of Ohio

[73] Assignee: MBT Holding AG

[*] Notice: This patent issued on a continued prosecution application filed under 37 CFR 1.53(d), and is subject to the twenty year patent term provisions of 35 U.S.C. 154(a)(2).

[21] Appl. No.: 09/183,907

[22] Filed: Oct. 30, 1998

Related U.S. Application Data

[62] Division of application No. 08/984,081, Dec. 3, 1997.

[51] Int. Cl.[7] .................................................. C09K 17/00
[52] U.S. Cl. .......................... 405/266; 405/263; 405/264; 106/900
[58] Field of Search ............................... 106/900, DIG. 1, 106/DIG. 3; 405/263, 266, 270, 264

[56] References Cited

U.S. PATENT DOCUMENTS

| | | | |
|---|---|---|---|
| 2,702,788 | 2/1955 | Dawson | 507/119 |
| 3,687,846 | 8/1972 | Lang | 405/264 |
| 3,696,621 | 10/1972 | Simms et al. | 405/264 |
| 3,759,197 | 9/1973 | Bracke | 111/200 |
| 4,016,124 | 4/1977 | Crisp et al. | 523/116 |
| 4,266,885 | 5/1981 | Naito et al. | 405/109 |
| 4,276,077 | 6/1981 | Zaslavsky et al. | 405/264 X |
| 4,303,438 | 12/1981 | Zaslavsky et al. | 405/264 X |
| 4,387,205 | 6/1983 | Zaslavsky et al. | 527/400 |
| 4,473,406 | 9/1984 | Bradley et al. | 524/5 |
| 4,521,452 | 6/1985 | Highsmith | 427/136 |
| 4,600,744 | 7/1986 | Libor et al. | 524/446 |
| 4,755,206 | 7/1988 | Clark | 71/27 |
| 4,761,183 | 8/1988 | Clarke | 106/177 |
| 4,897,119 | 1/1990 | Clarke | 106/117 |
| 4,941,536 | 7/1990 | Brothers et al. | 166/293 |

(List continued on next page.)

FOREIGN PATENT DOCUMENTS

| | | |
|---|---|---|
| 59-62689 | 4/1984 | Japan . |
| 59-84973 | 5/1984 | Japan . |
| 59-84974 | 5/1984 | Japan . |
| 1270549 | 10/1989 | Japan . |
| 04124441 | 7/1991 | Japan . |
| 3218956 | 9/1991 | Japan . |
| 5202516 | 8/1993 | Japan . |
| 6115995 | 4/1994 | Japan . |
| 5199623 | 7/1994 | Japan . |
| 6184535 | 7/1994 | Japan . |
| 6293542 | 10/1994 | Japan . |
| 7081995 | 3/1995 | Japan . |
| 8333573 | 12/1996 | Japan . |
| 9031458 | 2/1997 | Japan . |
| 2170839 | 8/1986 | United Kingdom . |
| WO 9748655 | 12/1997 | WIPO . |

OTHER PUBLICATIONS

Walker, Andrew D. "DSM Saves the Dam." *Civil Engineering*, Dec., pp. 48–51 1984.
Jasperse, Brian H. and Christopher R. Ryan.:"Geotech Import: Deep Soil Mixing." *Civil Engineering*, Dec., pp. 66–68, 1987.
Wong, Daniel O., et al. "Predicted and Observed Behavior of a Deep–Soil–Mixing Braced Wall."*Transportation Research Record* 1406: pp. 41–49, 1993.
Ryan, Christopher R. and Brian H. Jasperse. "Deep Soil Mixing at the Jackson Lake Dam." *Foundation Engineering*, pp.–354–367, 1989.
Author Unknown, "Deep Soil Mixing Builds Cut–Off Walls." *Civil Engineering* (*American Society of Civil Engineers* ) v. 60 May 1990, p. 27.
Parvin, Jean. "In Situ Soil Mixing: Environmental Engineers Use Innovation and Tighter Management to Succeed in Maturing Market." *ENR* v. 230, p.E5–6+, Jun. 14, 1993.
Yang, David M. and Shigeru Takeshima. "Soil Mix Walls in Difficult Ground," *In Situ Deep Soil Improvement Geotechnical Special Publication 45*, pp. 106–120, 1994.
Derwent WPI Accession Number 95–379880/199549, "Additive for reducing water content of cement compsn-.contg. clay–comprises homo–or co–polymer of acrylic acid, methacrylic acid vinylacetic acid or crotonic acid or salts" Derwent WPI, (Oct. 9, 1995).
Derwent WPI Accession Number 97–509121/199747,"Water reduing agent for fluidising soil–comprises hydroxy–carboxylic acid, a mixture of polyacrylic acid (co)polymers and calciumlignosulphonate," Derwent WPI, (Sep. 16, 1997).
Derwent WPI Accession Number 97–161801–199715, "Water reducing agent for cementcontg. viscous soil— contains oxycarboxylic acid or salt and homopolymer, copolymer or salt of (meth)acrylic acid polyvinyl acetate and crotonic acid monomer(s).," Derwent WPI, (Feb. 4, 1997).

*Primary Examiner*—Eileen Dunn Lillis
*Assistant Examiner*—Tara L. Mayo
*Attorney, Agent, or Firm*—Renner, Kenner, Greive, Bobak, Taylor & Weber

[57] ABSTRACT

A deep mix soil stabilization system comprises a hydraulic cement grout, and a soil dispersant comprising at least one of i) an acrylic acid polymer or copolymer, or a salt thereof, ii) an acrylic acid/sulfonic acid copolymer, or a salt thereof, iii) an acrylic acid/phosphonic acid copolymer or a salt thereof, and iv) a blend of an acrylic acid polymer with at least one of a sulfonic acid polymer and a phosphonic acid polymer, or a salt thereof. A deep mix soil stabilization method comprises drilling into soil while injecting a soil dispersant and subjecting the soil and the soil dispersant to mixing to form a soil and soil dispersant mixture, said soil dispersant comprising at least one of i) an acrylic acid polymer or copolymer, or a salt thereof, ii) an acrylic acid/sulfonic acid copolymer, or a salt thereof, iii) an acrylic acid/phosphonic acid copolymer or a salt thereof, iv) a blend of an acrylic acid polymer with at least one of a sulfonic acid polymer and a phosphonic acid polymer, or a salt thereof; and, mixing a cementitious binder with said soil and soil dispersant mixture to form a predominantly soil-containing stabilized soil.

26 Claims, No Drawings

6,076,997
Page 2

U.S. PATENT DOCUMENTS

| | | | |
|---|---|---|---|
| 5,021,094 | 6/1991 | Brown et al. | 106/803 |
| 5,026,215 | 6/1991 | Clarke | 405/266 |
| 5,049,288 | 9/1991 | Brothers et al. | 524/5 |
| 5,089,538 | 2/1992 | Iizuka et al. | 523/132 |
| 5,106,423 | 4/1992 | Clarke | 106/789 |
| 5,109,030 | 4/1992 | Chao et al. | 521/83 |
| 5,110,839 | 5/1992 | Chao | 521/83 |
| 5,141,366 | 8/1992 | Ishida et al. | 405/263 |
| 5,203,919 | 4/1993 | Bobrowski et al. | 106/802 |
| 5,210,112 | 5/1993 | Shimoda et al. | 423/132 |
| 5,263,797 | 11/1993 | Lindstrom et al. | 405/266 |
| 5,269,632 | 12/1993 | Pelletier et al. | 405/263 |
| 5,275,513 | 1/1994 | Geary, Jr. et al. | 405/266 |
| 5,350,820 | 9/1994 | Ono et al. | 526/240 |
| 5,355,955 | 10/1994 | Rodrigues et al. | 166/293 |
| 5,357,004 | 10/1994 | Calton et al. | 525/435 |
| 5,370,188 | 12/1994 | Cottrell | 166/369 |
| 5,371,177 | 12/1994 | Paik et al. | 528/361 |
| 5,371,179 | 12/1994 | Paik et al. | 528/363 |
| 5,378,085 | 1/1995 | Kono et al. | 405/233 |
| 5,389,702 | 2/1995 | Koo | 423/132 |
| 5,393,343 | 2/1995 | Darwin et al. | 106/808 |
| 5,407,909 | 4/1995 | Goodhue, Jr. et al. | 507/118 |
| 5,410,017 | 4/1995 | Bortnick et al. | 528/363 |
| 5,417,522 | 5/1995 | Kono et al. | 405/266 |
| 5,427,617 | 6/1995 | Bobrowski et al. | 106/802 |
| 5,442,038 | 8/1995 | Wood et al. | 528/363 |
| 5,472,051 | 12/1995 | Brothers | 166/293 |
| 5,476,142 | 12/1995 | Kajita | 166/294 |
| 5,478,919 | 12/1995 | Koskan et al. | 528/363 |
| 5,488,991 | 2/1996 | Cowan et al. | 166/293 |
| 5,502,117 | 3/1996 | Wood | 525/435 |
| 5,510,426 | 4/1996 | Wood | 525/435 |
| 5,510,427 | 4/1996 | Wood et al. | 525/435 |
| 5,512,096 | 4/1996 | Krause | 106/718 |
| 5,519,110 | 5/1996 | Wood et al. | 528/363 |
| 5,521,279 | 5/1996 | Wood et al. | 528/363 |
| 5,578,219 | 11/1996 | Kajita | 210/730 |
| 5,663,123 | 9/1997 | Goodhue et al. | 507/225 |
| 5,716,448 | 2/1998 | Furusawa et al. | 106/803 |
| 5,779,396 | 7/1998 | Mallon et al. | 405/264 |
| 5,814,147 | 9/1998 | Tallard | 106/900 |

DEEP MIX SOIL STABILIZATION METHOD

CROSS REFERENCE TO RELATED APPLICATIONS

The present application is a Divisional application of copending application U.S. Ser. No. 08/984,081 filed Dec. 3, 1997 which is incorporated herein by reference.

TECHNICAL FIELD

The present invention is directed to a cementitious system for soil stabilization in the deep soil mixing method. The present invention is more particularly directed to a method for soil stabilization in a deep soil mixing method using a soil dispersant, and a soil stabilization system including a cement grout and the soil dispersant.

BACKGROUND OF THE INVENTION

The Deep Soil Mixing Method (DSM) is a soil stabilization technique by which soil-cement walls or columns are formed in situ. The DSM method is practiced by the use of a crawler crane having a set of leads which guides a plurality of hydraulically driven mixing paddles and augers. The hollow stemmed augers penetrate the soil, and a grout slurry is injected into the soil through the auger tip. As the auger flights break up the soil, it is lifted to the mixing paddles where it is mixed with the grout as the auger continues downward and is subsequently withdrawn. The augers are next moved adjacent to and overlapping the first excavation and the procedure is repeated, so that a selected pattern of continuous soil-concrete walls is formed. Vertical reinforcing beams are often placed into the soil-concrete structure to increase bending resistance.

The DSM method is used to form soil-cement structures for excavation support walls, such as for tunnels, retaining walls, water cutoff walls, foundations, and the like. In addition to construction, the DSM method finds usefulness in soil stabilization, environmental remediation, backfilling and landfill applications.

A problem that is encountered, however, by the DSM method, is the difficulties encountered with highly cohesive soils, such as fine sand, silty soils and clay. An example of this is Boston Blue Clay, a glacial clay deposit that is very cohesive. The auger has difficulty augering into the soil, which is primarily this cohesive clay, to permit the introduction of a cement grout.

There are known disperants for clay, particularly bentonite clay, used in oil well drilling and some construction techniques. However, these are primarily useful for aqueous slurries carrying a small percentage of clay (5–10%) as a dispersion with water as the continuous fluid. In the DSM method, the continuous phase is the soil, containing about 25% water in a form that is primarily bound within the clay layers. These bentonite aqueous dispersants are useful for low concentrations of the clay in water, used to carry rock cuttings away from the drill bit. They are not useful in enhancing the workability of soil in the DSM method.

Another drawback of conventional clay dispersants with respect to the DSM method, is that when added to the soil, they cause immediate flocculation, or setting of the cement grout when it is contacted with the dispersant-soil mixture. This prevents thorough mixing of the cement grout with the soil which is needed so that uniform strength can be developed, and further prevents reinforcements from being placed into the soil-cement structure.

It is therefore an object of the present invention to provide a deep mix soil stabilization method which enhances workability of highly cohesive soils, such as fine sand, silty soil and clay.

It is also an object of the present invention to provide a deep mix soil stabilization method which enhances workability of highly cohesive soils, such as fine sand, silty soil and clay by the use of soil dispersants.

It is a further object of the invention to provide a deep mix soil stabilization method which avoids premature flocculation of the soil and cement grout mixture to permit thorough mixing of the soil and grout and the introduction of reinforcements into the soil-cement structure.

It is a further object of the invention to provide a deep mix soil stabilization method which uses soil dispersants which do not cause premature flocculation of the soil and cement grout mixture to permit thorough mixing of the soil and grout and the introduction of reinforcements into the soil-cement structure.

It is a further object of the invention to provide a deep mix soil stabilization method which provides lower viscosity of the soil-cement mixture, and enhances compressive strength development of the stabilized soil-cement structure.

It is a further object of the invention to provide a deep mix soil stabilization method which provides lower viscosity of the soil-cement mixture, and enhances compressive strength development of the stabilized soil-cement structure by the use of cement dispersants in combination with the soil dispersants.

These and other objects of the invention are accomplished by the method which is hereafter described and claimed.

SUMMARY OF THE INVENTION

The present invention therefore provides a deep mix soil stabilization method comprising: drilling into soil while injecting a soil dispersant and subjecting the soil and the soil dispersant to mixing to form a soil and soil dispersant mixture, said soil dispersant comprising at least one of i) an acrylic acid polymer or copolymer, or a salt thereof, ii) an acrylic acid/sulfonic acid copolymer, or a salt thereof, iii) an acrylic acid/phosphonic acid copolymer or a salt thereof, and iv) a blend of an acrylic acid polymer with at least one of a sulfonic acid polymer and a phosphonic acid polymer, or a salt thereof; and, mixing a cementitious binder with said soil and soil dispersant mixture to form a predominantly soil-containing stabilized soil.

The cementitious binder may be mixed into the soil simultaneously with, or subsequent to forming the soil and soil dispersant mixture. The cementitious binder is selected from the group consisting of hydraulic cement, lime, fly ash and mixtures thereof, and is preferably a portland cement grout. The cementitious binder may additionally contain a pozzolan, such as fly ash, silica fume, rice husk ash, natural pozzolans, metakaolinite and blast furnace slag. The cement grout may also contain an effective cement dispersant other than the soil dispersant, preferably selected from the group consisting of lignosulfonates, beta naphthalenesulfonates and mixtures thereof.

Preferably, the soil dispersant is a salt of the polymer or copolymer, most preferably selected from lithium, sodium, potassium, and ammonium salts, and mixtures thereof, particularly in the situation where the soil dispersant is mixed with the soil prior to the introduction of the cementitious binder.

The present invention therefore also provides a deep mix soil stabilization system comprising a hydraulic cement grout, and a soil dispersant comprising at least one of i) an acrylic acid polymer or copolymer, or a salt thereof, ii) an acrylic acid/sulfonic acid copolymer, or a salt thereof, iii) an acrylic acid/phosphonic acid copolymer or a salt thereof, and iv) a blend of an acrylic acid polymer with at least one of a sulfonic acid polymer and a phosphonic acid polymer, or a salt thereof.

PREFERRED EMBODIMENTS OF THE INVENTION

The present invention is a deep mix soil stabilization method, such as for preparing a stabilized soil formation to permit tunneling between portions of the stabilized columns or walls. The method includes drilling into the soil, such as by auguring into the soil, while injecting a soil dispersant, and mixing the soil and soil dispersant, to form a soil and soil dispersant mixture. The soil dispersant is at least one of i) an acrylic acid polymer or copolymer, or a salt thereof, ii) an acrylic acid/sulfonic acid copolymer, or a salt thereof, iii) an acrylic acid/phosphonic acid copolymer or a salt thereof, and iv) a blend of an acrylic acid polymer with at least one of a sulfonic acid polymer and a phosphonic acid polymer, or a salt thereof. In order to stabilize the soil, a cementitious binder is mixed with the soil and soil dispersant mixture to form a predominantly soil-containing, stabilized soil.

The cementitious binder can be mixed either simultaneously with or subsequent to forming the soil and soil dispersant mixture. That is, the cementitious binder can be injected, or pumped, into the soil at the same time that the soil dispersant is being injected or pumped into the soil, such as when the auger is drilling down into the soil. In this embodiment, the soil dispersant may be introduced into the soil as a component of the cement grout. Alternatively, the soil dispersant can be pumped into and mixed with the soil while the auger is drilling down, and the cementitious binder can be introduced into and mixed with the soil/soil dispersant mixture while the auger is being withdrawn from the soil.

The method of the present invention includes positioning reinforcements into the stabilized soil, such as steel rods or cages.

The method of the present invention, utilizing the soil dispersants permits the stabilization of even highly cohesive soil, such as fine sands, silty soils, and clay. The present soil stabilization method is most preferred when the soil to be stabilized contains a high proportion of clay. For purposes of exemplification, the present invention has been tested with Boston Blue Clay, from the Boston harbor area, the results of which are reported below.

It should be understood that the method of the present invention, utilizing the defined soil dispersants, is able to enhance the workability of a soil mass containing predominantly soil, such as the highly cohesive Boston Blue type clay. The soil dipersants of the present invention are therefore capable of dispersing the soil matrix in a much more rigorous environment, compared to previous soil dispersants which were used to disperse small portions of bentonite clay in aqueous suspensions, such as a drilling mud. Additionally, the soil dispersants used in the present method are capable of maintaining workability of the soil matrix even after cementitious binder has been introduced to the mixture, while prior dispersants could not prevent immediate flocculation of the binder/soil mixture. Since it is preferred that reinforcing steel be placed into the soil/dispersant/binder mixture prior to setting, it is necessary that premature flocculation of the mixture be avoided.

In the present soil stabilization method, the soil dispersant is introduced, or injected, into the soil in an amount of about 0.1% to about 5% by weight of the soil to be treated. As the dispersant is injected in situ, the weight of the soil to be treated can be estimated based upon the volume to be treated and the measured or calculated density of the soil. Preferably, the soil dispersant is injected into the soil in an amount of about 0.5% to about 2% by weight of soil.

The acrylic acid polymer, copolymer, or blended polymer soil dispersants of the present invention can be utilized in either the acid form, particularly when introduced into the soil together with the cementitious binder, or as salts of the acid, which is the preferred mode when introduced into the soil prior to the introduction of the cement binder. Most preferably, the acrylic acid polymer, copolymer or blended polymer soil dispersant is a salt of lithium, sodium, potassium, ammonium, or mixtures of the salts. Generally, the pH of the soil dispersant formulation should be above about 6, and preferably the pH of is above about 7.

In certain embodiments, the acrylic acid/sulfonic acid copolymer dispersant of the present invention may contain at least one of vinyl sulfonic residues or acrylimidomethanepropane sulfonic residues, in order to introduce the sulfonic moiety into the polymer. In another embodiment, the soil dispersant is a graft polymer comprising a ketone-aldehyde condensation or co-condensation product or their salts, wherein the product comprises:

a) a ketone containing aliphatic, araliphatic, cyclic or aromatic hydrocarbon radicals, provided at least one radical is nonaromatic;

b) an aldehyde of the formula R—(CHO)$_n$, wherein n=1 to 2 and R is hydrogen or an aliphatic, araliphatic, aromatic or heterocyclic radical; and, c) an acid group selected from carboxyl, sulfo, sulfamido, sulfoxy, sulfoalkylamine and sulfoalkyloxy;

to which product at least one of anionic, nonionic, and cationic unsaturated monomers are grafted.

Preferably, the soil dispersant of the present invention is at least one of a sodium salt of polyacrylic acid, an acrylic acid sulfonic acid copolymer, an ammonium salt of an acrylic acid sulfonic acid copolymer, a sodium salt of an acrylic acid sulfonic acid copolymer and a blend of an acrylic acid polymer with a sulfonic acid copolymer or salts thereof. Representative examples of suitable soil dispersants according to the present invention include but are not limited to ACCUMER® 9000 sodium salt of acrylic acid/sulfonic acid copolymer, ACCUMER® 9300 sodium salt of polyacrylic acid, ACCUMER® 9400 sodium salt of polyacrylic acid, GOOD-RITE® K-775 acrylic acid/sulfonic acid copolymer, and POLYTHIN® acrylic acid/sulfonic acid copolymer. ACCUMER® 9000, ACCUMER® 9300 and ACCUMER® 9400 are trademarks of Rohm & Haas; GOOD-RITE® K-775 is a trademark of BF Goodrich, and POLYTHIN® is a trademark of SKW Trostberg AG. The soil dispersant is also referred to herein as the clay dispersant, in accord with a particular embodiment of the invention.

In order to provide optimum workability of the soil, it is preferred that the weight average molecular weight of said soil dispersant is below about 10,000. It is most preferred that the weight average molecular weight of said soil dispersant is about 2,000 to about 5,000.

According to the present invention, the cementitious binder used in the deep mix soil stabilization system of the present invention is selected from hydraulic cement, lime, fly ash and their mixtures. Preferably the cementitious binder is a portland cement grout. The cementitious binder may additionally contain a pozzolan, such as fly ash, silica fume, rice husk ash, natural pozzolans, metakaolinite, and blast furnace slag. A preferred range of cement to soil is about 5 to about 50% by weight.

In a preferred embodiment of the invention, the cement grout also contains a cement dispersant other than the soil dispersant. This aids in reducing the water/cement ratio of the grout, so that ultimately the cement and water content of the stabilized soil is reduced, while maintaining the desired strength. The use of the cement dispersant lowers the viscosity of the grout leading to compressive strength development, and can also enhance the initial workability of the soil. Any cement dispersant compatible with the soil dispersant may be utilized, but lignosulfonates, beta naphthalenesulfonates and their mixtures are preferred. The cement dispersant may be added in amounts conventional to the industry, preferably about 0.05 to about 1.5% by weight based on the weight of the cement.

SPECIFIC EMBODIMENTS OF THE INVENTION

The following terms are defined for purposes of this specification. Cement Factor: the weight of cement per cubic yard of treated soil. Cement Content: the ratio of weight of cement to the weight of dry soil in the composition. Moisture Content: the ratio of weight of water to the weight of dry solids in the composition.

The mix composition, as prepared, is shown below. The Boston Blue Clay was supplied from the Boston, Mass. area with an average moisture content of 24%.

| | |
|---|---|
| Boston Blue Clay (as received) | 1983 g |
| Added $H_2O$ | 214 g |
| Cement (Ashgrove Type I Portland) | 303 g |
| Cement Factor | 380 lb/yd$^3$ |
| Cement Content | 20% |
| Moisture Content | 38% |
| Water:cement ratio | 0.71 |
| Specific gravity | 2.31 |

The laboratory mix and testing procedure was as follows:

1. Place soil (as received) in mixer (Hobart N-50).
2. Add 43% of the added water (deionized), with the dispersant, and mix for one minute at slow speed.
3. Measure flow on flow table after 25 drops (method: ASTM C-230).
4. Prepare the cement slurry by mixing the remaining water with the cement and the cement dispersant (if used).
5. Blend the cement slurry with the soil mixture prepared in step 2, and mix for one minute at slow speed.
6. Measure flow immediately, and fifteen and thirty minutes after mixing has completed (ASTM C-230).
7. Optionally, measure flow forty-five and sixty minutes after mixing has completed (ASTM C-230).
8. Fabricate specimens for compressive strength testing (ASTM D-2166) immediately after the final flow measurement.

EXAMPLES OF DISPERSANTS WITH RESPECT TO CLAY SOIL

Examples 1–12 Effect of Dispersants on the Workability of Clay Soil and Clay Soil/Cement Blends, and Compressive Strength of Stabilized Soil Thirteen dispersants, which represented a wide range of chemistries, were compared for dispersion of clay soil, with testing proceeding as described above.

Table 1 reports the data obtained from testing the effect of the dispersants on the fluidity of the clay slurry and treated soil, and the data obtained on the 28-day unconfined compressive strength tests on the treated soil.

TABLE 1

| Example | Dispersant | Dosage (by weight of clay (%) | Flow of clay slurry and dispersant | Flow of treated soil- Initially after mixing with cement slurry | Flow of treated soil- 15 minutes after mixing with cement slurry | Flow of treated soil- 30 minutes after mixing with cement slurry |
|---|---|---|---|---|---|---|
| 1 | sodium salt of acrylic acid/sulfonic acid copolymer | 2.0 | 76 | 85 | 84 | 84 |
| 2 | sodium polyacrylate | 2.0 | 77 | 76 | 65 | 62 |
| 3 | hydroxy ethylidene diphosphonic acid (HEDP) | 0.5 | 85 | 14 | 12 | N/T |
| 4 | sodium polyacrylate | 2.0 | 91 | 111 | 94 | 96 |
| 5 | sodium polyacrylate and MPEG 350-(50/50) | 4.0 | 91 | 70 | 60 | 66 |
| 6 | sodium polyacrylate and MPEG 350-(50/50) | 4.0 | 95 | 77 | 59 | 62 |
| 7 | sodium hexametaphosphate | 1.0 | 88 | 63 | 6 | N/T |
| 8 | sodium tripolyphosphate | 1.0 | 85 | 29 | 8 | N/T |
| 9 | acrylic acid sulfonic acid copolymer | 1.0 | 76 | 119 | 123 | 125 |
| 10 | ammonium salt of acrylate copolymer | 2.0 | 51 | 4 | N/T | N/T |

TABLE 1-continued

| Example | Dispersant | Dosage (by weight of clay (%)) | Flow of clay slurry and dispersant | Flow of treated soil- Initially after mixing with cement slurry | Flow of treated soil- 15 minutes after mixing with cement slurry | Flow of treated soil- 30 minutes after mixing with cement slurry |
| --- | --- | --- | --- | --- | --- | --- |
| 11 | sodium salt of acrylic acid/sulfonic acid copolymer | 1.25 | 97 | >129 | 143 | 136 |
| 12 | lithium oxalate | 1.0 | 107 | 11 | N/T | N/T |

Note: The flow values are unitless and are relative. Higher values denote higher fluidity. N/T denotes not tested, For comparison, the clay as received attains a flow of 32 by the same method. MPEG 350 = methoxypolyethylene Table 1 demonstrates that only 7 of the 13 tested dispersants gave acceptable fluidity 60 minutes after the grout was added. Of those, Examples Nos. 1, 4, 9 & 11 provided superior performance, especially the latter two. It was found that certain of the dispersants tested caused premature flocculation when the soil-dispersant mixture was contacted with the cement grout.

Table 1 shows that 5 mixes gave very low strengths, whereas 3 other mixes gave strengths in excess of 400 psi. It was speculated that the relatively high dispersant levels introduced into the clay had an adverse effect on the setting and/or hydration characteristics of the grout/soil mixture.

Examples 13–27

Testing was performed in the same manner as in Example 1–12, with the exception that in Examples 22–27, the water/cement ratio of the grout was reduced. In these cases, the amount of water added to the initial clay slurry was not changed, therefore the water content of the treated soil was lower.

Examples 13–15 Effect of Lowering the Clay Dispersant Dosage

The dosages of clay dispersant were varied to find the lowest level at which a reasonable fluidity of clay slurry and treated soil could be established (arbitrarily defined as a flow of more than 50 after 25 drops of the flow table). Complete evaluations were conducted after the preferred dosage of each of three clay dispersants was determined, referenced to below as:

D-(POLYTHIN®) acrylic acid/sulfonic acid copolymer
E-(GOOD-RITE® K-775) sodium salt of acrylic acid/ sulfonic acid copolymer
F-(ACCUMER® 9000) sodium salt of acrylic acid/ sulfonic acid copolymer Table 2 reports the test results on the fluidity of the clay slurries and treated soils, and the 28-day unconfined compressive strength of the treated soils. For each clay dispersant, the dosage rate was lowered from that previously tested. The strength results show that the dosage reduction had a positive effect for the treated soil which contained (ACCUMER® 9000) sodium salt of acrylic acid/sulfonic acid copolymer, little effect on the treated soil which contained (GOOD-RITE® K-775) sodium salt of acrylic acid/ sulfonic acid copolymer, and a negative effect on the treated soil which contained (POLYTHIN®) acrylic acid/sulfonic acid copolymer.

TABLE 2

| Example No./ Dispersant | Dosage (by weight of clay) (%) | Flow of clay slurry and dispersant | Flow of treated soil Initially after mixing with cement slurry | Flow of treated soil 15 minutes after mixing with cement slurry | Flow of treated soil 30 minutes after mixing with cement slurry | 28 day unconfined compressive strength (psi) |
| --- | --- | --- | --- | --- | --- | --- |
| 13/D | 0.75 | 70 | 67 | 58 | 56 | 250 |
| 14/E | 1.0 | 82 | 81 | 64 | 60 | 560 |
| 15/F | 1.5 | 79 | 68 | 72 | 73 | 690 |

Examples 16–18 Effect of Adding Cement Dispersant POZZOLITH® 80 to the 0.4 Water/ Cement Ratio Cement Slurry These examples included the same materials as in Examples 13–15, except that, POZZOLITH® 80 was added to the cement slurry in the amount of 0.3% by weight of cement. Table 3 reports the test results on the fluidity of the clay slurries and treated soils, and the 28-day unconfined compressive strength of the treated soils. Compared to the data in Table 2, the POZZOLITH® 80 addition improved the fluid and strength properties of the treated soil which contained (POLYTHIN®) acrylic acid/sulfonic acid copolymer, and gave comparable results on the treated soils which contained (GOOD-RITE® K-775) sodium salt of acrylic acid/sulfonic copolymer and (ACCUMER® 9000) sodium salt of acrylic acid/sulfonic acid copolymer.

TABLE 3

| Example No./ Dispersant | Dosage (by weight of clay) (%) | Flow of clay slurry and dispersant | Flow of treated soil Initially after mixing with cement slurry | Flow of treated soil 15 minutes after mixing with cement slurry | Flow of treated soil 30 minutes after mixing with cement slurry | 28 day unconfined compressive strength (psi) |
|---|---|---|---|---|---|---|
| 16/D | 0.75 | 70 | 75 | 75 | 73 | 510 |
| 17/E | 1.0 | 82 | 73 | 61 | 62 | 600 |
| 18/F | 1.5 | 79 | 66 | 71 | 73 | 690 |

Examples 19–21 Effect of Adding Cement Dispersant RHEOBUILD® 1000 Beta Naphthalene Sulfonate Cement Dispersant to the 0.4 Water/ Cement Ratio Cement Slurry These examples included the same materials as in Example 13–15, except that RHEOBUILD® 1000 beta naphthalene sulfonate cement dispersant was added to the cement slurry in the amount of 0.3% by weight of cement. Table 4 reports the test results on the fluidity of the clay slurries and treated soils, and the 28-day unconfined compressive strength of the treated soils. Compared to the data in Table 2, the RHEOBUILD® 1000 beta naphthalene sulfonate cement dispersant addition improved the fluid and strength properties of the treated soil which contained (POLYTHIN®) acrylic acid/sulfonic acid copolymer, decreased the fluid and strength properties of the treated soil which contained (ACCUMER® 9000) sodium salt of acrylic acid/sulfonic acid copolymer, and had little effect on the treated soils which contained (GOOD-RITE® K-775) sodium salt of acrylic acid/sulfonic acid copolymer.

fonate cement dispersant was added to the cement slurry and the water content of the stabilized soil was lowered by reducing the water/cement ratio of the cement slurry to 0.305. It was experimentally determined that the flow of a 0.4 water/cement ratio cement slurry without cement dispersants was equivalent to the flow of a 0.305 water/cement ratio cement slurry with POZZOLITH® 80 lignosulfonate cement dispersant added. Table 5 shows the test results on the fluidity of the clay slurries and treated soils, and the 28-day unconfined compressive strength of the treated soils. Compared to the data in Table 3, the POZZOLITH® 80 lignosulfonate cement dispersant addition and reduction in the water cement ratio of the cement slurry improved the strength properties of the treated soils which contained the clay dispersants. The fluid properties of the treated soil that contained (POLYTHIN) acrylic acid/sulfonic acid copoly

TABLE 4

| Example No./ Dispersant | Dosage (by weight of clay) (%) | Flow of clay slurry and dispersant | Flow of treated soil Initially after mixing with cement slurry | Flow of treated soil 15 minutes after mixing with cement slurry | Flow of treated soil 30 minutes after mixing with cement slurry | 28 day unconfined compressive strength (psi) |
|---|---|---|---|---|---|---|
| 19/D | 0.75 | 70 | 82 | 82 | 73 | 410 |
| 20/E | 1.0 | 82 | 55 | 52 | 48 | 510 |
| 21/F | 1.5 | 79 | 64 | 62 | 61 | 460 |

Examples 22–24 Effect of Adding Cement Dispersant to the 0.305 Water/Cement Ratio Cement Slurry These examples included the same materials as in Example 13–15, except that POZZOLITH® 80 lignosulmer was improved, that contained (ACCUMER 9000) sodium salt of acrylic acid/sulfonic acid copolymer was unaffected, and that contained (GOOD-RITE® K-775) sodium salt of acrylic acid/sulfonic acid copolymer was slightly reduced.

TABLE 5

| Example No./ Dispersant | Dosage (by weight of clay) (%) | Flow of clay slurry and dispersant | Flow of treated soil Initially after mixing with cement slurry | Flow of treated soil 15 minutes after mixing with cement slurry | Flow of treated soil 30 minutes after mixing with cement slurry | 28 day unconfined compressive strength (psi) |
|---|---|---|---|---|---|---|
| 22/D | 0.75 | 70 | 84 | 84 | 80 | 640 |
| 23/E | 1.0 | 82 | 46 | 45 | 37 | 810 |
| 24/F | 1.5 | 79 | 66 | 60 | 66 | 950 |

Examples 25–27 Effect of Adding Cement Dispersant RHEOBUILD® 1000 Beta Naphthalene Sulfonate Cement Dispersant to the 0.265 Water/Cement Ratio Cement Slurry These examples included the same materials as in Examples 13–15, except that RHEOBUILD® 1000 beta naphthalene sulfonate cement dispersant was added to the cement slurry in the amount of 0.3% by weight of cement, and the water content of the stabilized soil was lowered by reducing the water/cement ratio of the cement slurry to 0.265. It was experimentally determined that the flow of a 0.4 water/cement ratio cement slurry without cement dispersants was equivalent to the flow of a 0.265 water/cement ratio cement slurry with RHEOBUILD® 1000 beta naphthalene sulfonate cement dispersant. Table 6 reports the test results on the fluidity of the clay slurries and treated soils, and the 28-day unconfined compressive strength of the treated soils. Compared to the data in Table 4, the RHEOBUILD® 1000 beta naphthalene sulfonate cement dispersant addition and reduction in the water/cement ratio of the cement slurry improved the strength properties of the treated soils which contained the clay dispersants (GOOD-RITE® K-775) sodium salt of acrylic acid/sulfonic acid copolymer or (ACCUMER 9000) sodium salt of acrylic acid/sulfonic acid copolymer. The fluid properties of the treated soil that contained (ACCUMER 9000) sodium salt of acrylic acid/sulfonic acid copolymer was unaffected, while those which contained (POLYTHIN®) acrylic acid/sulfonic acid copolymer or (GOOD-RITE® K-775) sodium salt of acrylic acid/sulfonic acid copolymer was reduced. All three samples showed improved strength as compared to the results reported in Table 2 (without a cement dispersant).

strength of the soil/cement structure after set. The increased fluidity of the soil/cement mixture aids permits the deep soil mixing method to be used in highly cohesive soils, such as Boston Blue Clay.

The present invention therefore provides a deep mix soil stabilization method which enhances workability of highly cohesive soils, such as fine sand, silty soil and clay, by the use of soil dispersants as described and exemplified above. The present invention provides a deep mix soil stabilization method which avoids premature flocculation of the soil and cement grout mixture to permit thorough mixing of the soil and grout and the introduction of reinforcements into the soil-cement structure, by the use of the soil dispersants described and exemplified above. The present invention further provides a deep mix soil stabilization method which provides lower viscosity of the soil-cement mixture, and enhances compressive strength development of the stabilized soil-cement structure by the use of cement dispersants in combination with the soil dispersants. The cement dispersant-soil dispersant combination enhances the initial workability of the soil, and permits reduction of the water cement ratio of the grout. The compressive strength is therefore enhanced, which permits a reduction in the cement content of the stabilized soil to achieve the same strength.

Thus it is demonstrated that the objects of the present invention are met. The examples included above are for illustrative purposes only and the present invention is not to be limited to them. It is to be understood that other hydraulic cements, cement dispersants, cement admixtures and the like can be included in the deep mix soil stabilization system and method of the present invention, without departing from the

TABLE 6

| Example No./ Dispersant | Dosage (by weight of clay) (%) | Flow of clay slurry and dispersant | Flow of treated soil Initially after mixing with cement slurry | Flow of treated soil 15 minutes after mixing with cement slurry | Flow of treated soil 30 minutes after mixing with cement slurry | 28 day unconfined compressive strength (psi) |
|---|---|---|---|---|---|---|
| 25/D | 0.75 | 70 | 47 | 34 | 24 | 340 |
| 26/E | 1.0 | 82 | 34 | 37 | 37 | 730 |
| 27/F | 1.5 | 79 | 51 | 58 | 60 | 940 |

The characteristics of the soil/cement mixture can therefore be controlled by the use, according to the invention, of dispersants for the soil and optionally for the cement, to provide enhanced fluidity of the mixture, and or to optimize spirit of the invention herein disclosed and described. Thus, the scope of the invention shall include all modifications and variations that may fall within the scope of the attached claims and equivalent embodiments.

We claim:

1. A deep mix soil stabilization method comprising:

drilling into soil while injecting a soil dispersant and subjecting the soil and the soil dispersant to mixing to form a soil and soil dispersant mixture, said soil dispersant comprising at least one of i) an acrylic acid copolymer, or a salt thereof, ii) a copolymer of acrylic acid and sulfonic acid, or a salt thereof, and iii) a copolymer of acrylic acid and phosphonic acid, or a salt thereof, and iv) a blend of an acrylic acid polymer with at least one of a sulfonic acid polymer and a phosphonic acid polymer, or a salt thereof; and, mixing a cementitious binder with said soil and soil dispersant mixture to form a predominantly soil-containing stabilized soil.

2. The method of claim 1 wherein said mixing the cementitious binder is subsequent to said forming the soil and soil dispersant mixture.

3. The method of claim 1 wherein said mixing the cementitious binder is simultaneous with said forming the soil and soil dispersant mixture.

4. The method of claim 1 including positioning reinforcements into the stabilized soil.

5. The method of claim 1 wherein the soil is a cohesive soil.

6. The method of claim 1 wherein the soil contains clay.

7. The method of claim 6 wherein the soil is predominantly Boston Blue type clay.

8. The method of claim 1 wherein the weight average molecular weight of said soil dispersant is below about 10,000.

9. The method of claim 1 wherein the weight average molecular weight of said soil dispersant is about 2,000 to about 5,000.

10. The method of claim 1 wherein the pH of said soil dispersant is above about 6.

11. The method of claim 1 wherein the pH of said soil dispersant is above about 7.

12. The method of claim 1 wherein the soil dispersant is injected into the soil in an amount of about 0.1% to about 5% by weight of soil.

13. The method of claim 1 wherein the soil dispersant is injected into the soil in an amount of about 0.5% to about 2% by weight of soil.

14. The method of claim 1 wherein the soil dispersant is a salt.

15. The method of claim 1 wherein the soil dispersant is a salt selected from lithium, sodium, potassium, ammonium, and mixtures thereof.

16. The method of claim 1 wherein the soil dispersant is a copolymer of acrylic acid and sulfonic acid and contains vinyl sulfonic residues.

17. The method of claim 1 wherein the soil dispersant is a copolymer of acrylic acid and sulfonic acid and contains acrylimidomethanepropane sulfonic residues.

18. The method of claim 1 wherein the soil dispersant is selected from at least one of the group consisting of an acrylic acid sulfonic acid copolymer, an ammonium salt of an acrylic acid sulfonic acid copolymer, a sodium salt of an acrylic acid sulfonic acid copolymer, and a blend of an acrylic acid polymer with a sulfonic acid copolymer or salts thereof.

19. The method of claim 1 wherein the cementitious binder is selected from the group consisting of hydraulic cement, lime, fly ash and mixtures thereof.

20. The method of claim 19 wherein the cementitious binder is a portland cement grout.

21. The method of claim 19 wherein the cementitious binder additionally contains a pozzolan.

22. The method of claim 21 wherein the pozzolan is selected from the group consisting of fly ash, silica fume, rice husk ash, natural pozzolans, metakaolinite, and blast furnace slag.

23. The method of claim 19 wherein the cementitious binder also contains a cement dispersant other than said soil dispersant.

24. The method of claim 24 wherein the cement dispersant is selected from the group consisting of lignosulfonates, beta naphthalenesulfonates and mixtures thereof.

25. A deep mix soil stabilization method comprising:

drilling into soil while injecting a soil dispersant and subjecting the soil and the soil dispersant to mixing to form a soil and soil dispersant mixture, said soil dispersant comprising at least one of i) an acrylic acid polymer or copolymer, or a salt thereof, ii) a copolymer of acrylic acid and sulfonic acid, or a salt thereof, and iii) a copolymer of acrylic acid and phosphonic acid, or a salt thereof, and iv) a blend of an acrylic acid polymer with at least one of a sulfonic acid polymer and a phosphonic acid polymer, or a salt thereof; and, mixing a cementitious binder with said soil and soil dispersant mixture to form a predominantly soil-containing stabilized soil, wherein the soil dispersant is a graft polymer comprising at least one of a ketone-aldehyde condensation or co-condensation product and salts thereof, wherein said product comprises:

a) a ketone containing aliphatic, araliphatic, cyclic or aromatic hydrocarbon radicals, provided at least one radical is nonaromatic;

b) an aldehyde of the formula R—(CHO)$_n$, wherein n=1 to 2 and R is hydrogen or an aliphatic, araliphatic, aromatic or heterocyclic radical; and, c) an acid group selected from the group consisting of carboxyl, sulfo, sulfamido, sulfoxy, sulfoalkylamine and sulfoalkyloxy;

to which product at least one of anionic, nonionic, and cationic unsaturated monomers are grafted.

26. A deep mix soil stabilization method comprising:

drilling into soil while injecting a soil and soil dispersant mixture, said soil dispersant comprising at least one of i) an acrylic acid polymer or copolymer, or a salt thereof, ii) a copolymer of acrylic acid and sulfonic acid, or a salt thereof, and iii) a copolymer of acrylic acid and phosphonic acid, or a salt thereof, and iv) a blend of an acrylic acid polymer with at least one of a sulfonic acid polymer and a phosphonic acid polymer, or a salt thereof; and, simultaneously mixing a cementitious binder with said soil and soil dispersant mixture to form a predominantly soil-containing stabilized soil.

* * * * *